US011026223B2

(12) United States Patent
Nam et al.

(10) Patent No.: US 11,026,223 B2
(45) Date of Patent: Jun. 1, 2021

(54) BANDWIDTH PART (BWP) SELECTION

(71) Applicant: QUALCOMM Incorporated, San Diego, CA (US)

(72) Inventors: Wooseok Nam, San Diego, CA (US); Tao Luo, San Diego, CA (US); Peter Pui Lok Ang, San Diego, CA (US); Heechoon Lee, San Diego, CA (US); Olufunmilola Omolade Awoniyi-Oteri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/748,562

(22) Filed: Jan. 21, 2020

(65) Prior Publication Data

US 2020/0245304 A1 Jul. 30, 2020

Related U.S. Application Data

(60) Provisional application No. 62/796,473, filed on Jan. 24, 2019.

(51) Int. Cl.
*H04W 72/04* (2009.01)
*H04L 5/00* (2006.01)

(52) U.S. Cl.
CPC ......... *H04W 72/042* (2013.01); *H04L 5/0023* (2013.01); *H04L 5/0042* (2013.01)

(58) Field of Classification Search
CPC .......... H04W 72/042; H04L 5/003; H04L 5/0091–0092; H04L 5/0094; H04L 5/0096; H04L 5/0023; H04L 5/0042
See application file for complete search history.

(56) References Cited

U.S. PATENT DOCUMENTS

2011/0237243 A1* 9/2011 Guvenc ............. H04W 72/1231
455/423
2013/0203434 A1* 8/2013 Blume .................. H03F 1/0261
455/452.1

(Continued)

FOREIGN PATENT DOCUMENTS

WO 2019237979 A1 12/2019
WO 2019242710 A1 12/2019

OTHER PUBLICATIONS

Huawei, et al., "On Bandwidth Adaptation", 3GPP Draft, 3GPP TSG-RAN WG1 NR Ad-Hoc Meeting, R1-1711424, 3rd Generation Partnership Project (3GPP), Mobile Competence Centre, 650, Route Des Lucioles, F-06921 Sophia-Antipolis Cedex, France, vol. RAN WG1, No. Qingdao, China, Jun. 27, 2017-Jun. 30, 2017, Jun. 30, 2017 (Jun. 30, 2017), 5 Pages, XP051300612, Retrieved from the Internet: URL: http://www.3gpp.org/ftp/Meetings_3GPP_SYNC/RAN1/Docs/, [retrieved on Jun. 26, 2017], Proposal 5, Section 3, Section 1-4.

(Continued)

*Primary Examiner* — Kevin C. Harper
(74) *Attorney, Agent, or Firm* — Harrity & Harrity, LLP / Qualcomm

(57) ABSTRACT

Various aspects of the present disclosure generally relate to wireless communication. In some aspects, a user equipment (UE) may receive a second communication, of a bandwidth part (BWP) selection process, that indicates a subset of BWPs, of a set of BWPs, to be selected as a set of active BWPs, wherein the set of BWPs is configured to the UE for a component carrier via radio resource control signaling as a first communication of the BWP selection process, wherein the subset of BWPs includes one or more BWPs of the set of BWPs. In some aspects, the UE may select the subset of BWPs as the set of active BWPs based at least in part on receiving the second communication, wherein a (Continued)

particular BWP, of the subset of BWPs, is to be used for a post-BWP selection process communication. Numerous other aspects are provided.

30 Claims, 14 Drawing Sheets

(56) References Cited

U.S. PATENT DOCUMENTS

| | | | | |
|---|---|---|---|---|
| 2017/0347268 | A1* | 11/2017 | Chen | H04B 1/7143 |
| 2018/0183551 | A1* | 6/2018 | Chou | H04L 5/001 |
| 2018/0343154 | A1 | 11/2018 | Park et al. | |
| 2018/0368112 | A1* | 12/2018 | Sebeni | H04W 52/0209 |
| 2019/0182716 | A1 | 6/2019 | Futaki et al. | |
| 2019/0215807 | A1* | 7/2019 | Hwang | H04L 27/2602 |
| 2020/0059961 | A1* | 2/2020 | Do | H04L 27/2607 |
| 2020/0107308 | A1* | 4/2020 | Liao | H04W 72/042 |
| 2020/0213067 | A1* | 7/2020 | Cirik | H04L 5/0051 |

OTHER PUBLICATIONS

International Search Report and Written Opinion—PCT/US2020/014616—ISA/EPO—dated May 8, 2020.

* cited by examiner

BANDWIDTH PART (BWP) SELECTION

CROSS-REFERENCE TO RELATED APPLICATION

This patent application claims priority to U.S. Provisional Patent Application No. 62/796,473, filed on Jan. 24, 2019, entitled "BANDWIDTH PART (BWP) SELECTION," and assigned to the assignee hereof. The disclosure of the prior application is considered part of and is incorporated by reference in this patent application.

FIELD OF THE DISCLOSURE

Aspects of the present disclosure generally relate to wireless communication, and to techniques and apparatuses for bandwidth part (BWP) selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a base station (BS), a second communication, of a bandwidth part (BWP) selection process, that indicates a subset of BWPs, of a set of BWPs, to be selected as a set of active BWPs, wherein the set of BWPs is configured to the UE for a component carrier (CC) via radio resource control (RRC) signaling as a first communication of the BWP selection process, wherein the subset of BWPs includes one or more BWPs of the set of BWPs; and selecting the subset of BWPs from the set of BWPs as the set of active BWPs based at least in part on receiving the second communication, wherein a particular BWP, of the subset of BWPs, is to be used for a post-BWP selection process communication.

In some aspects, a UE for wireless communication may include memory and one or more processors operatively coupled to the memory. The memory and the one or more processors may be configured to receive, from a BS, a second communication, of a BWP selection process, that indicates a subset of BWPs, of a set of BWPs, to be selected as a set of active BWPs, wherein the set of BWPs is configured to the UE for a CC via RRC signaling as a first communication of the BWP selection process, wherein the subset of BWPs includes one or more BWPs of the set of BWPs; and select the subset of BWPs from the set of BWPs as the set of active BWPs based at least in part on receiving the second communication, wherein a particular BWP, of the subset of BWPs, is to be used for a post-BWP selection process communication.

In some aspects, a non-transitory computer-readable medium may store one or more instructions for wireless communication. The one or more instructions, when executed by one or more processors of a UE, may cause the one or more processors to receive, from a BS, a second communication, of a BWP selection process, that indicates a subset of BWPs, of a set of BWPs, to be selected as a set of active BWPs, wherein the set of BWPs is configured to the UE for a CC via RRC signaling as a first communication of the BWP selection process, wherein the subset of BWPs includes one or more BWPs of the set of BWPs; and select the subset of BWPs from the set of BWPs as the set of active BWPs based at least in part on receiving the second communication, wherein a particular BWP, of the subset of BWPs, is to be used for a post-BWP selection process communication.

In some aspects, a first apparatus for wireless communication may include means for receiving, from a second apparatus, a second communication, of a BWP selection process, that indicates a subset of BWPs, of a set of BWPs, to be selected as a set of active BWPs, wherein the set of BWPs is configured to the first apparatus for a CC via RRC signaling as a first communication of the BWP selection process, wherein the subset of BWPs includes one or more BWPs of the set of BWPs; and means for selecting the subset of BWPs from the set of BWPs as the set of active BWPs based at least in part on receiving the second communication, wherein a particular BWP, of the subset of BWPs, is to be used for a post-BWP selection process communication.

In some aspects, a method of wireless communication, performed by a BS, may include determining to transmit a first communication, of a BWP selection process, associated with configuring a set of BWPs to a UE for a CC, wherein the set of BWPs includes more than four BWPs, wherein a subset of BWPs that includes one or more BWPs is to be selected from the set of BWPs as a set of active BWPs; and transmitting, to the UE, the first communication based at least in part on determining to transmit the first communication.

In some aspects, a base station for wireless communication may include memory and one or more processors operatively coupled to the memory. The memory and the one or more processors may be configured to determine to transmit a first communication, of a BWP selection process, associated with configuring a set of BWPs to a UE for a CC, wherein the set of BWPs includes more than four BWPs, wherein a subset of BWPs that includes one or more BWPs is to be selected from the set of BWPs as a set of active BWPs; and transmitting, to the UE, the first communication based at least in part on determining to transmit the first communication.

In some aspects, a non-transitory computer-readable medium may store one or more instructions for wireless communication. The one or more instructions, when executed by one or more processors of a BS, may cause the one or more processors to determine to transmit a first communication, of a BWP selection process, associated with configuring a set of BWPs to a UE for a CC, wherein the set of BWPs includes more than four BWPs, wherein a subset of BWPs that includes one or more BWPs is to be selected from the set of BWPs as a set of active BWPs; and transmit, to the UE, the first communication based at least in part on determining to transmit the first communication.

In some aspects, a first apparatus for wireless communication may include means for determining to transmit a first communication, of a BWP selection process, associated with configuring a set of BWPs to a second apparatus for a CC, wherein the set of BWPs includes more than four BWPs, wherein a subset of BWPs that includes one or more BWPs is to be selected from the set of BWPs as a set of active BWPs; and means for transmitting, to the second apparatus, the first communication based at least in part on determining to transmit the first communication.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
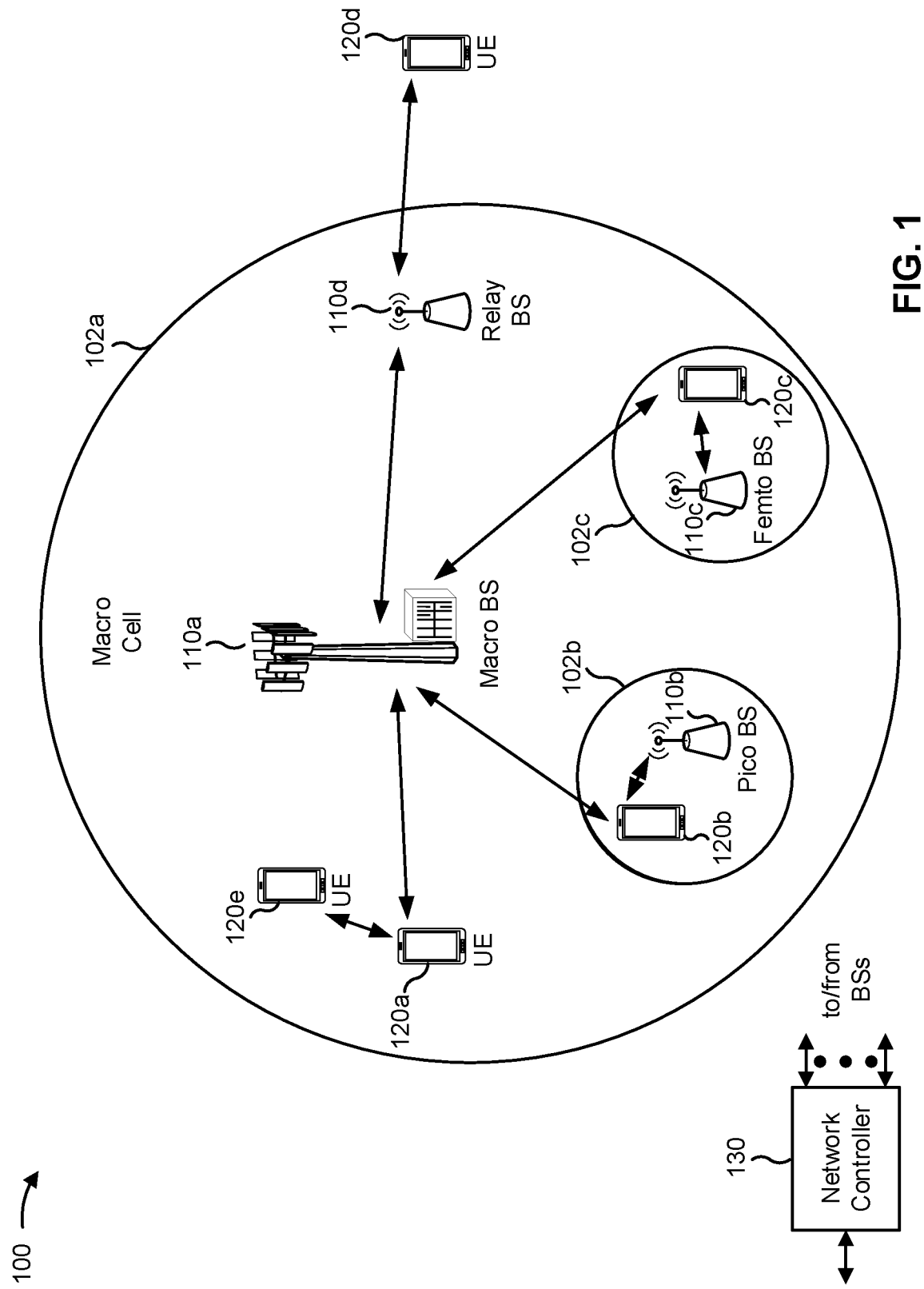
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
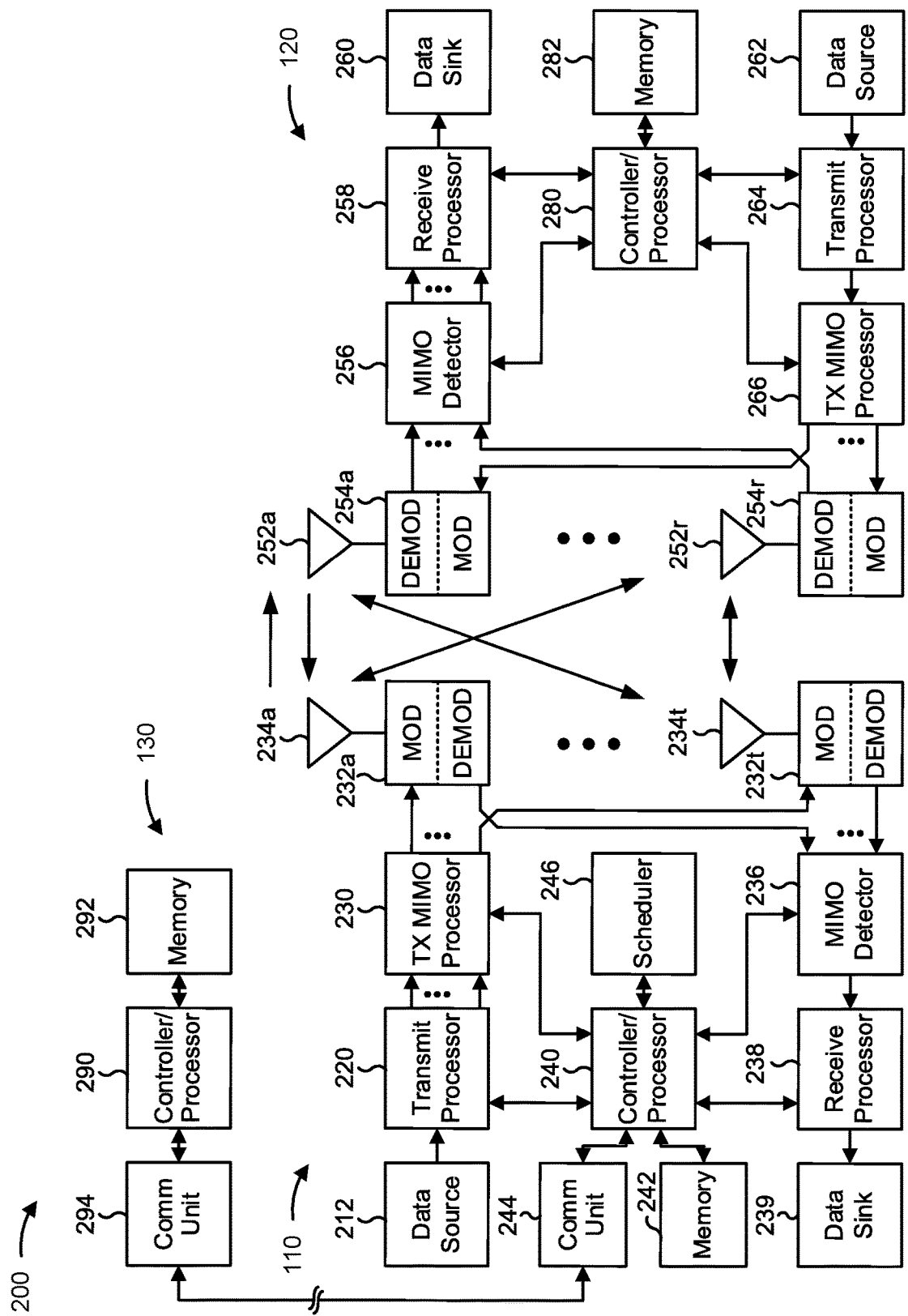
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with bandwidth part (BWP) selection, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving, from BS 110, a second communication, of a bandwidth part (BWP) selection process, that indicates a subset of BWPs, of a set of BWPs, to be selected as a set of active BWPs, wherein the set of BWPs is configured to UE 120 for a component carrier (CC) via radio resource control (RRC) signaling as a first communication of the BWP selection process, wherein the subset of BWPs includes one or more BWPs of the set of BWPs; means for selecting the subset of BWPs from the set of BWPs as the set of active BWPs based at least in part on receiving the second communication, wherein a particular BWP, of the subset of BWPs, is to be used for a post-BWP selection process communication; and/or the like. In some aspects, such means may include one or more components of UE 120 described in connection with FIG. 2.

In some aspects, BS 110 may include means for determining to transmit a first communication, of a BWP selection process, associated with configuring a set of BWPs to UE 120 for a CC, wherein the set of BWPs includes more than four BWPs, wherein a subset of BWPs that includes one or more BWPs is to be selected from the set of BWPs as a set of active BWPs; means for transmitting, to UE 120, the first communication based at least in part on determining to transmit the first communication; and/or the like. In some aspects, such means may include one or more components of base station 110 described in connection with FIG. 2.

As indicated above, FIG. 2 is provided as an example. Other examples may differ from what is described with regard to FIG. 2.

Figure 3A:
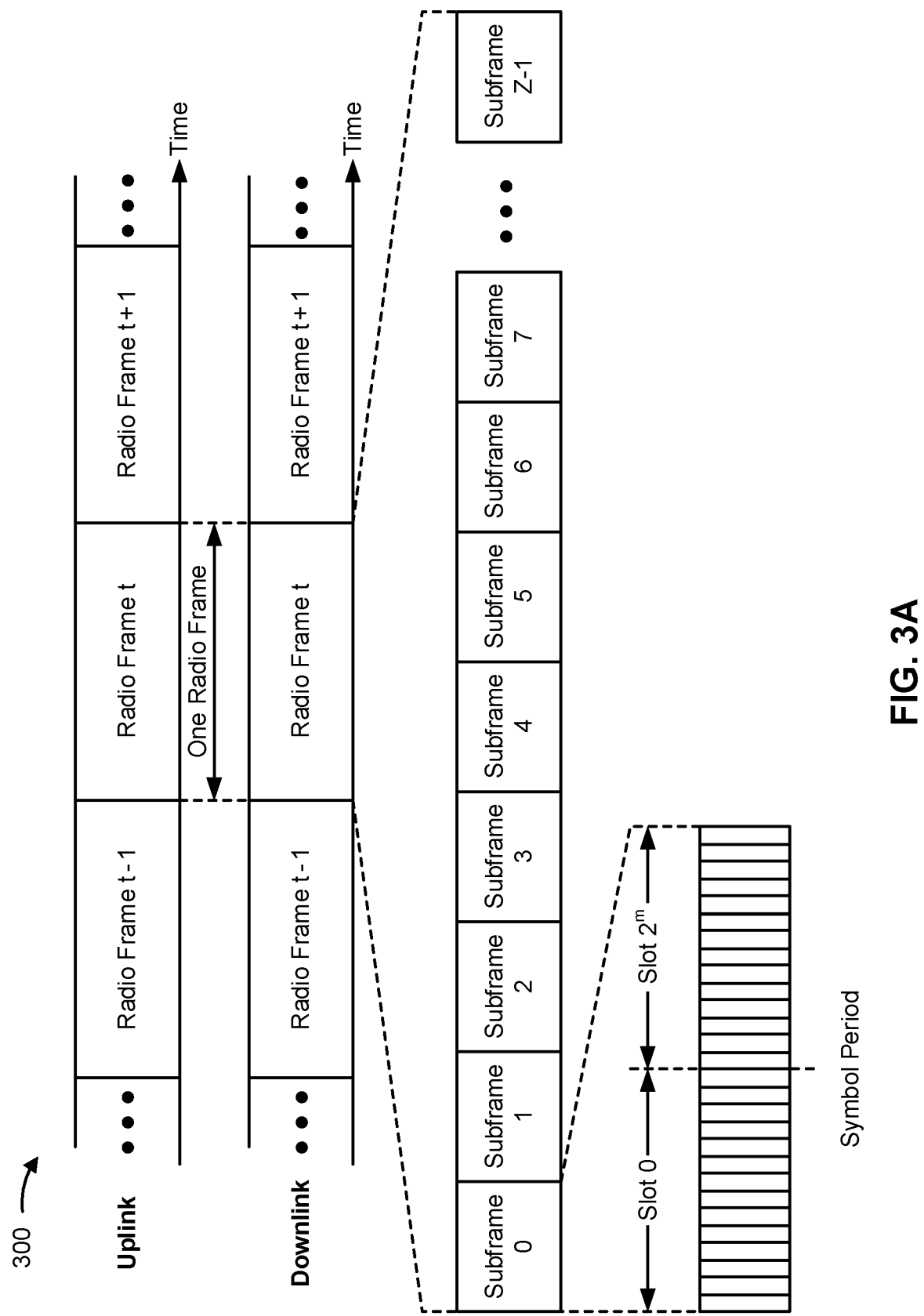
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
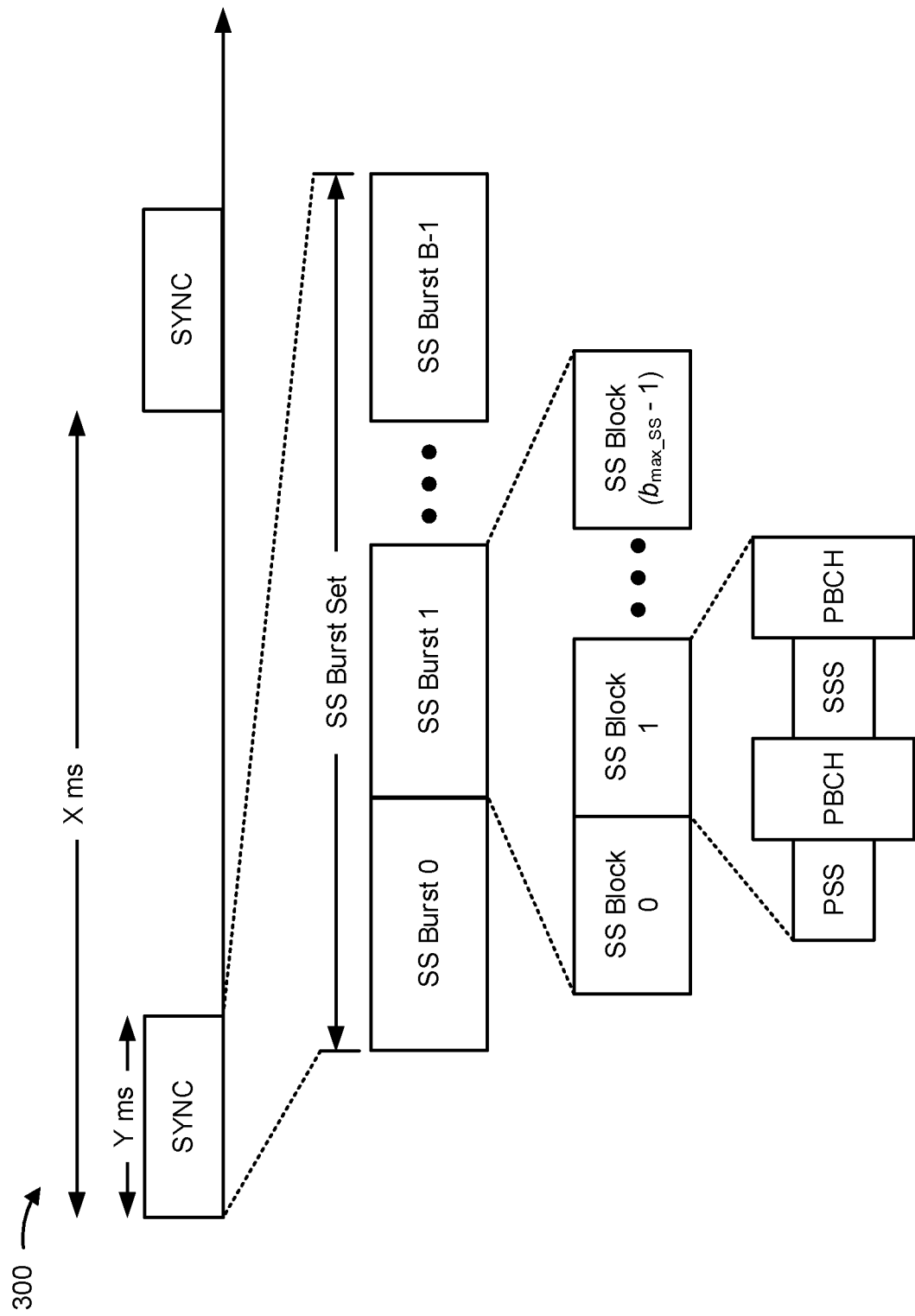
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
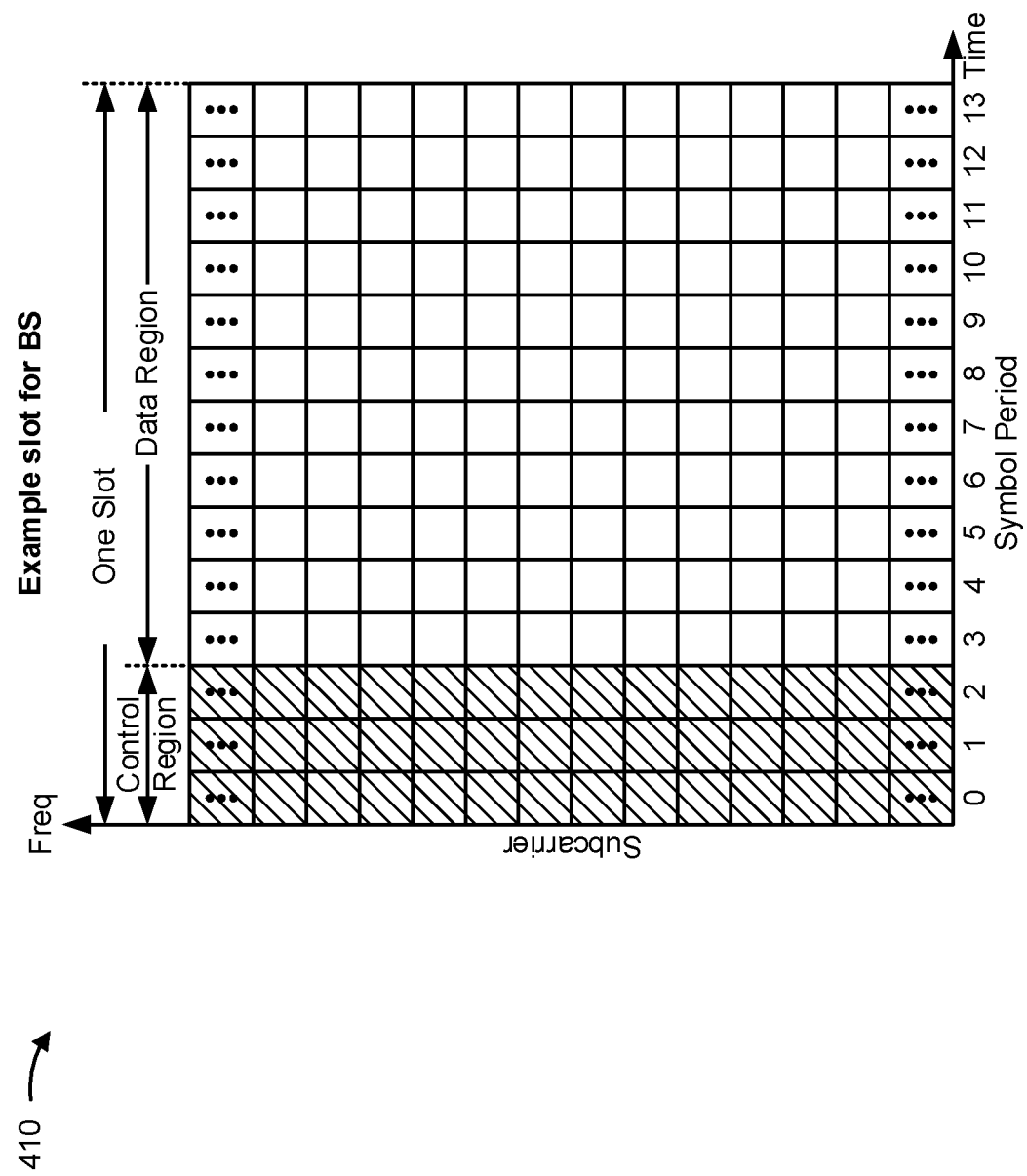
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, and/or the like, where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
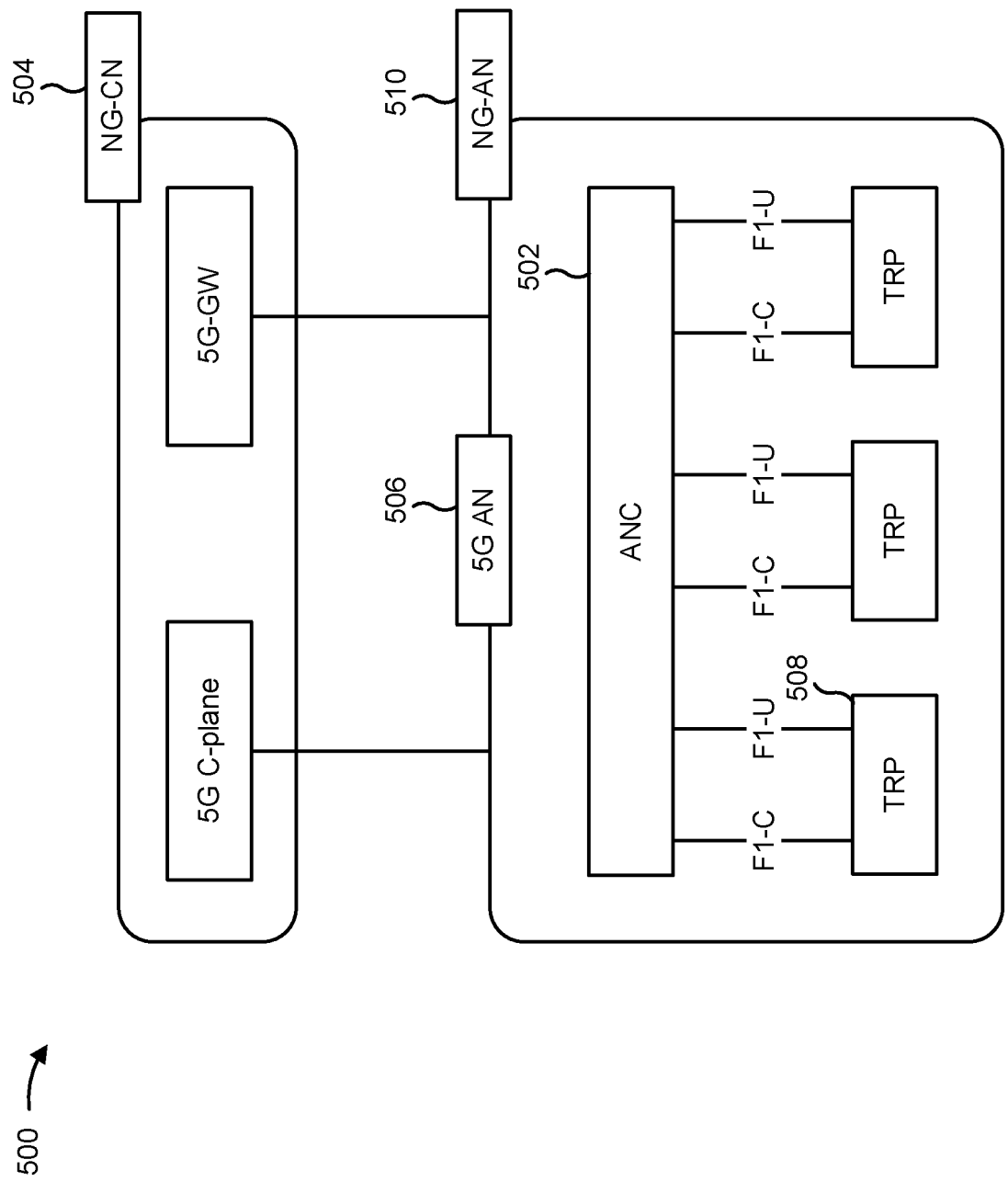
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
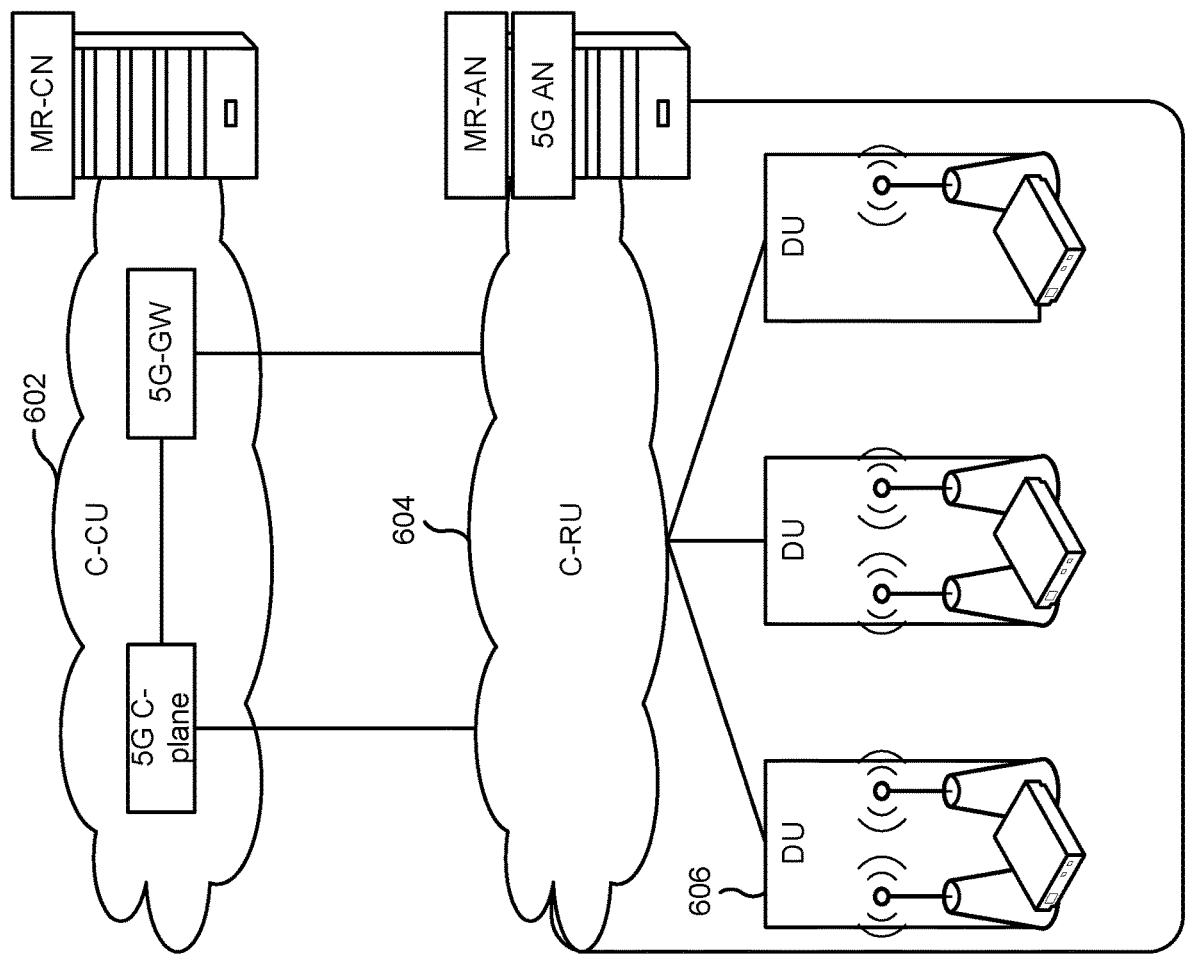
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

Figure 7:
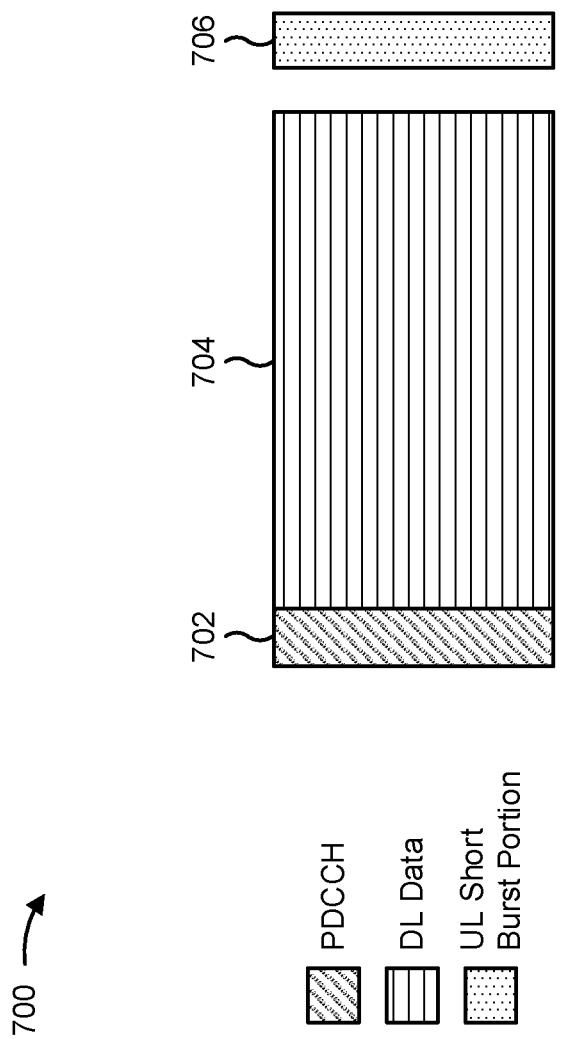
FIG. 7 is a diagram illustrating an example of a downlink (DL)-centric slot, in accordance with various aspects of the present disclosure.

FIG. 7 is a diagram 700 showing an example of a DL-centric slot or wireless communication structure. The DL-centric slot may include a control portion 702. The control portion 702 may exist in the initial or beginning portion of the DL-centric slot. The control portion 702 may include various scheduling information and/or control information corresponding to various portions of the DL-centric slot. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 704. The DL data portion 704 may sometimes be referred to as the payload of the DL-centric slot. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PD SCH).

The DL-centric slot may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric slot. For example, the UL short burst portion 706 may include feedback information corresponding to the control portion 702 and/or the data portion 704. Non-limiting examples of information that may be included in the UL short burst portion 706 include an ACK signal (e.g., a physical uplink control channel (PUCCH) ACK, a physical uplink shared channel (PUSCH) ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 7 is provided as an example. Other examples may differ from what is described with regard to FIG. 7.

Figure 8:
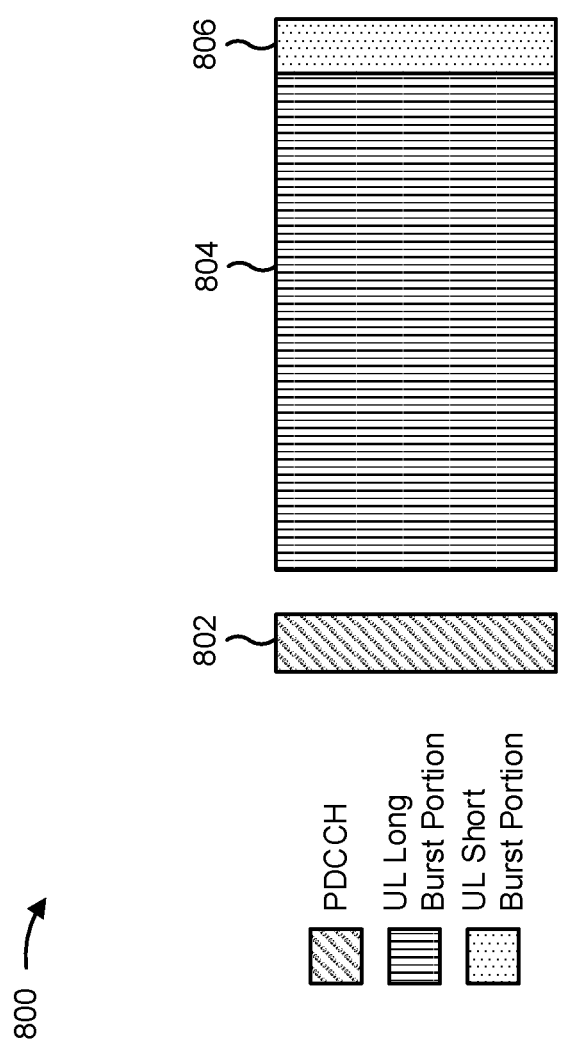
FIG. 8 is a diagram illustrating an example of an uplink (UL)-centric slot, in accordance with various aspects of the present disclosure.

FIG. 8 is a diagram 800 showing an example of an UL-centric slot or wireless communication structure. The UL-centric slot may include a control portion 802. The control portion 802 may exist in the initial or beginning portion of the UL-centric slot. The control portion 802 in FIG. 8 may be similar to the control portion 702 described above with reference to FIG. 7. The UL-centric slot may also include an UL long burst portion 804. The UL long burst portion 804 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 806. The UL short burst portion 806 in FIG. 8 may be similar to the UL short burst portion 706 described above with reference to FIG. 7, and may include any of the information described above in connection with FIG. 7. The foregoing is one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 8 is provided as an example. Other examples may differ from what is described with regard to FIG. 8.

NR supports use of BWPs. For example, a UE is configured with up to four BWPs (for UL and DL each) per CC. Each BWP configuration includes a center frequency, a bandwidth, a numerology, and/or one or more other parameters for physical channel configuration, such as for a PDCCH, PDSCH, PUCCH, PUSCH, RACH, and/or the like. Different BWPs can have the same or different bandwidths, center frequencies, subcarrier spacing, and/or the like depending on the BWP configuration.

BWPs can be used to accommodate reduced UE bandwidth capability, for load balancing within a CC, to facilitate UE power saving, and/or the like. In addition, a UE can use BWP switching, where different BWPs are used at different times or for different communications. In some aspects, the BWP switching is indicated via a 2-bit indicator in downlink control information (DCI) received from a BS. While BWP switching can facilitate use of different BWPs, the limited number of BWPs available to the UE (i.e., four BWPs) may not be sufficient to provide the UE with needed flexibility to dynamically adapt use of BWPs to different scenarios. For example, four BWPs may not provide the UE with enough flexibility to adapt to different types of traffic (e.g., voice traffic, text traffic, image traffic, and/or the like), a rate at which a mix of the different types of traffic changes, and/or the like. This can lead to latency in communications between the UE and the BS due to reconfiguration of a different set of four BWPs to the UE for different types and/or mixes of traffic.

Merely increasing the quantity of BWPs configured to the UE may not adequately address a lack of flexibility caused by the UE being configured with only four BWPs. For example, increasing the quantity of BWPs may increase a signaling overhead associated with configuring the increased quantity of BWPs configured to the UE, associated with switching between the BWPs used for communications, and/or the like. Continuing with the previous example, if N BWPs (N greater than 4) are configured to the UE by the BS, a required size of a BWP indicator field in scheduling DCI associated with selecting a particular BWP (or switching between BWPs) needs to be increased to $\lceil \log_2 N \rceil$ bits.

Some techniques and apparatuses described herein provide for selecting a BWP for use by the UE from a set of BWPs that includes more than four BWPs. For example, a UE may be configured, by a BS, with a set of BWPs that includes more than four BWPs, may select a subset of the set of BWPs as a set of active BWPs based at least in part on signaling from the BS, and may select a BWP from the subset of BWPs to use for a post-BWP selection process communication based at least in part on signaling from the BS. In this way, the UE may be configured with more than four BWPs and/or may select a BWP from more than four BWPs without a need to reconfigure the UE with a new set of four BWPs, thereby reducing latency that would otherwise occur as a result of needing to reconfigure the UE with a new set of BWPs and/or conserving processing resources associated with reconfiguring the UE. In addition, some techniques and apparatuses described herein provide for configuration of a UE with more than four BWPs without increasing a size of a BWP indicator field in scheduling DCI, thereby conserving bandwidth that would otherwise be consumed as a result of an increased overhead of the BWP indicator.

Figure 9:
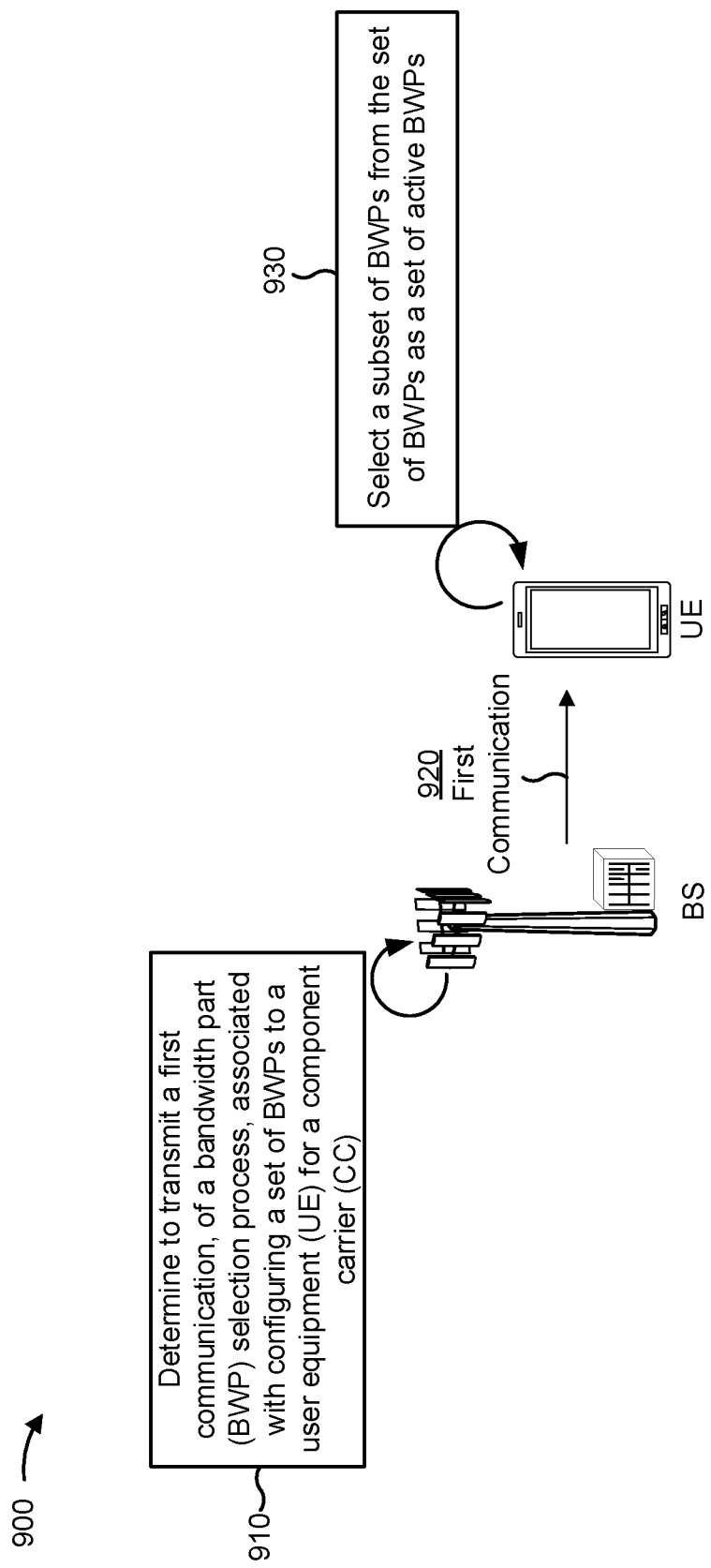
FIG. 9 is a diagram illustrating an example of BWP selection, in accordance with various aspects of the present disclosure.

FIG. 9 is a diagram illustrating an example 900 of bandwidth part (BWP) selection, in accordance with various aspects of the present disclosure. For example, FIG. 9 shows a BWP selection process. As shown in FIG. 9, example 900 includes a BS (e.g., BS 110) and a UE (e.g., UE 120).

As shown by reference number 910, the BS may determine to transmit a first communication, of a BWP selection process, associated with configuring a set of BWPs to a UE for a CC. For example, the BS may determine to transmit the first communication based at least in part on a connection of the UE to the BS, according to a schedule, based at least in part on receiving a request from the UE for configuration of the set of BWPs, and/or the like. In some aspects, the first communication may include RRC signaling. For example, one or more parameters of the RRC signaling may configure the set of BWPs to the UE. In some aspects, the first communication may include another form of signaling.

In some aspects, the set of BWPs may include more than four BWPs (e.g., five BWPs, ten BWPs, and/or the like). Additionally, or alternatively, and as described elsewhere herein, the set of BWPs may include one or more groups of BWPs. For example, the one or more groups of BWPs may be based at least in part on a set of grouping criteria, such as a set of baseband-related parameters that differ across the one or more groups of BWPs. Continuing with the previous example, the set of baseband-related parameters may include a scheduling offset (e.g., a k0, a k1, a k2, and/or the like offset), an aperiodic channel state information reference signal (A-CSI-RS) triggering offset, a time-domain resource allocation, and/or the like. Continuing still with the previous example, various BWPs may be grouped into a group of BWPs based at least in part on being associated with switching delays that are less than a particular offset.

As shown by reference number 920, the BS may transmit, and the UE may receive, the first communication. For example, the BS may transmit, and the UE may receive, the first communication based at least in part on the BS determining to transmit the first communication. In some aspects, the first communication may cause the UE to be configured with a set of BWPs. In some aspects, based at least in part on transmitting the first communication to the UE to configure the UE with the set of BWPs, the BS may transmit a second communication, of the BWP selection process, to the UE. For example, the second communication may be associated with causing the UE to select a subset of BWPs from the set of BWPs as a set of active BWPs (e.g., from which a particular BWP is to be used for a post-BWP selection process communication). In some aspects, the second communication may include RRC signaling, a medium access control control element (MAC CE), downlink control information (DCI), and/or the like.

As shown by reference number 930, the UE may select a subset of BWPs from the set of BWPs as a set of active BWPs. For example, the UE may select the subset of BWPs based at least in part on receiving the second communication from the BS. Continuing with the previous example, the second communication may include information (e.g., in RRC signaling, a MAC CE, DCI, and/or the like) that identifies the subset of BWPs, and the UE may select the subset of BWPs based at least in part on the information that identifies the subset of BWPs. In some aspects, the subset of BWPs may include one or more BWPs of the set of BWPs. In some aspects, based at least in part on the subset of BWPs being the set of active BWPs, a particular BWP from the subset of BWPs may be used for a post-BWP selection process communication to be transmitted from, or received by, the UE, as described elsewhere herein.

In some aspects, when selecting the subset of BWPs, the UE may add BWPs into the subset of BWPs (e.g., to generate the subset of BWPs, to increase a quantity of BWPs included in the subset of BWPs, and/or the like). Additionally, or alternatively, when selecting the subset of BWPs, the UE may remove one or more BWPs from the subset of BWPs (e.g., may remove one or more BWPs from an existing subset of BWPs, and/or the like). In some aspects, the UE may add or remove BWPs based at least in part on another second communication of the BWP selection process from the BS (e.g., received from the BS after the UE initially selects a subset of the BWPs).

In some aspects, the subset of BWPs may include a default BWP (e.g., to be used for a post-BWP selection process communication when the BS has not specified a different BWP that the UE is to use). For example, the UE may maintain the default BWP in the subset of BWPs after replacing one or more BWPs of the subset of BWPs. Continuing with the previous example, as the UE adds or removes BWPs from the subset of BWPs, the UE may not remove the default BWP from the subset of BWPs and/or may default to using the default BWP as the particular BWP for post-BWP selection process communications, described elsewhere herein, unless instructed otherwise by the BS. In some aspects, the default BWP may be a lower power BWP than other BWPs included in the subset of BWPs. Additionally, or alternatively, the default BWP may be a lower bandwidth BWP than other BWPs included in the subset of BWPs.

In some aspects, when the set of BWPs includes various groups of BWPs, the subset of BWPs may be a group of BWPs of the various groups of BWPs. In this case, the UE may select the subset of BWPs by selecting a particular group of BWPs from the various groups of BWPs (e.g., based at least in part on the second communication of the BWP selection process). In some aspects, the UE may add another group of BWPs to the subset of BWPs, may remove a group of BWPs from the subset of BWPs, and/or the like (e.g., may switch between groups of BWPs as the subset of BWPs). For example, the UE may modify the group of BWPs selected as the subset of BWPs based at least in part on a DCI-based indicator, a MAC CE, RRC signaling, and/or the like included in another second communication from the BS. In some aspects, switching a group of BWPs in the subset of BWPs from a first group to a second group (e.g., inter-group BWP switching) may be associated with a switching delay. For example, the switching delay may be based at least in part on pre-configured information, such as pre-configured information that identifies a DCI and timer based BWP switch delay, an RRC based BWP switch delay, and/or the like.

In some aspects, the UE may select a particular BWP from the subset of BWPs based at least in part on a third communication of the BWP selection process. For example, the UE may select the particular BWP based at least in part on a BWP indicator included in DCI received by the UE from the BS (e.g., the BWP indicator may indicate to the UE the particular BWP that the UE is to select). In some aspects, the particular BWP may be associated with transmitting and/or receiving a post-BWP selection process communication. For example, the UE may use the particular BWP to transmit a post-BWP selection process communication to the BS and/or to receive a post-BWP selection process communication from the BS.

In some aspects, the UE may switch BWPs as the particular BWP (e.g., may replace the particular BWP with another BWP) based at least in part on another third communication received from the BS after initially selection a particular BWP. For example, the UE may replace the particular BWP with another BWP based at least in part on receiving updated DCI from the BS. In some aspects, switching the particular BWP with another BWP may be associated with a switching delay. For example, the switching delay may be a near-zero delay that is less than a DCI and timer based BWP switch delay, an RRC based BWP switch delay, and/or the like. Continuing with the previous example, when switching BWPs within a group of BWPs (e.g., intra-group BWP switching), the switching delay may be less than a delay identified in pre-configured information, used for inter-group BWP switching, based at least in part on the BWPs of the group of BWPs being associated with similar switching delays (e.g., that are less than a particular offset).

In some aspects, and based at least in part on selecting the particular BWP, the UE may transmit a post-BWP communication to the BS using the particular BWP. Additionally, or alternatively, and based at least in part on selecting the particular BWP, the UE may receive a post-BWP selection process communication from the BS using the particular BWP.

As indicated above, FIG. 9 is provided as an example. Other examples may differ from what is described with respect to FIG. 9.

Figure 10:
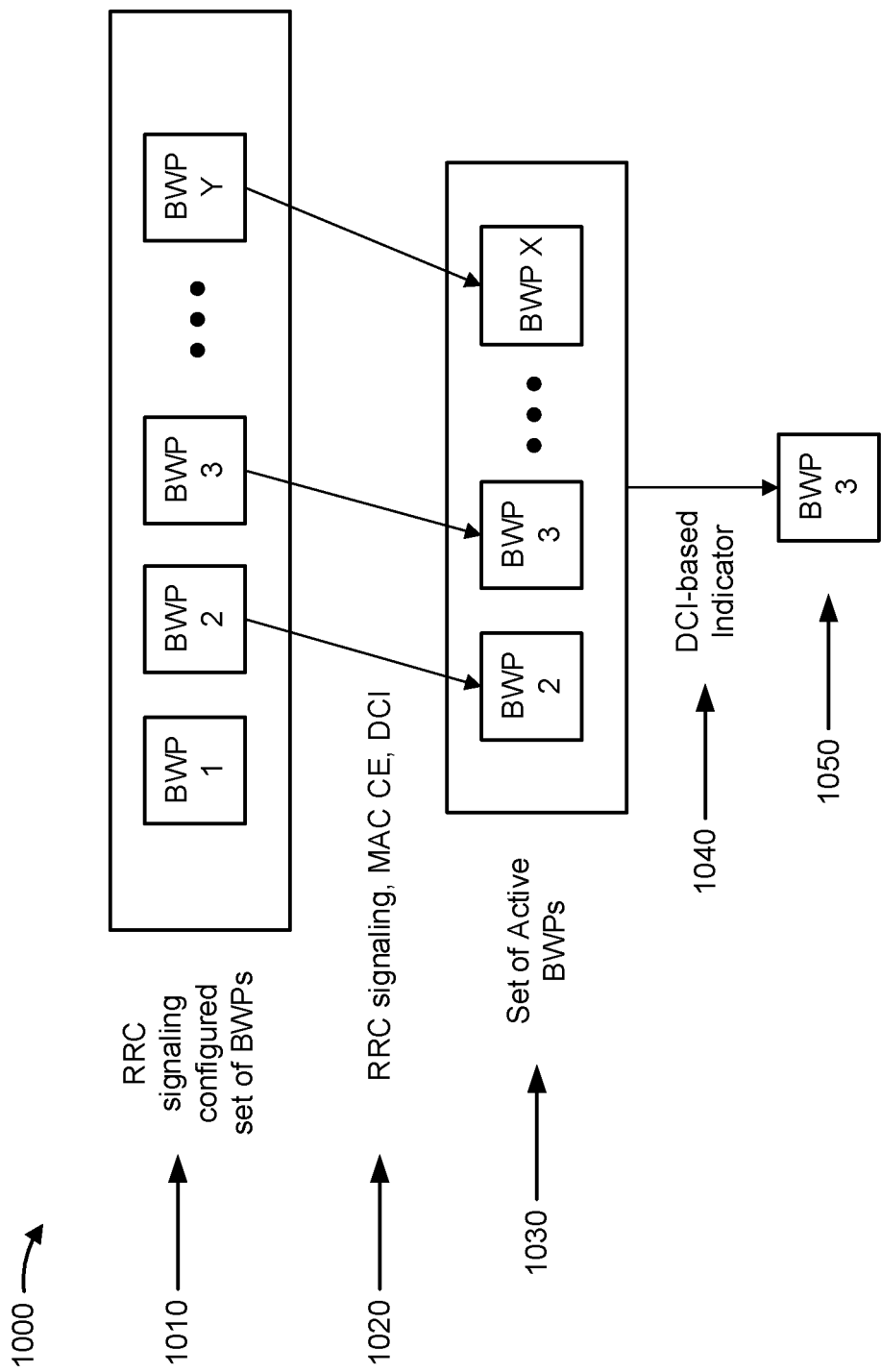
FIG. 10 is a diagram illustrating an example of BWP selection, in accordance with various aspects of the present disclosure.

FIG. 10 is a diagram illustrating an example 1000 of bandwidth part (BWP) selection, in accordance with various aspects of the present disclosure. FIG. 10 shows an example of configuration of a set of BWPs, selection of a subset of BWPs from the set of BWPs as a set of active BWPs, and selection of a particular BWP from the subset of BWPs for a post-BWP selection process communication, as described elsewhere herein.

As shown by reference number 1010, a set of BWPs may be configured to a UE (e.g., UE 120) via RRC signaling (shown as "RRC signaling configured set of BWPs"). For example, the set of BWPs shown in FIG. 10 includes BWP 1 through BWP Y, which were configured to the UE via a first communication of a BWP selection process. As shown by reference 1020, and based at least in part on RRC signaling, a MAC CE, and/or DCI from a BS (e.g., BS 110), the UE may select a subset of BWPs from the set of BWPs. For example, the RRC signaling, the MAC CE, and/or the DCI may be a second communication of the BWP selection process and may include information that identifies the subset of BWPs to be selected from the set of BWPs.

As shown by reference number 1030, the subset of BWPs may be a set of active BWPs. For example, the UE may select a particular BWP from the subset of BWPs for a post-BWP selection process communication, as described elsewhere herein. As shown in FIG. 10, the set of active BWPs may include BWP2 through BWP X, where BWP X has a number label greater than BWP 3 and less than or equal to BWP Y, for example. As shown by reference number 1040, and based at least in part on a DCI-based indicator included in a third communication of the BWP selection process, the UE may select a particular BWP from the set of active BWPs to use for a post-BWP selection process communication. As shown by reference number 1050, the UE may select BWP 3, for example, as the particular BWP.

In some aspects, the UE may transmit or receive a post-BWP selection process communication using BWP 3. In some aspects, the UE may receive another DCI-based indicator (e.g., in another third communication of the BWP selection process) and may select a different BWP as the particular BWP. Additionally, or alternatively, the UE may receive additional RRC signaling, an additional MAC CE, and/or additional DCI (e.g., as another second communication of the BWP selection process), and may select a different subset of BWPs as the set of active BWPs.

As indicated above, FIG. 10 is provided as an example. Other examples may differ from what is described with respect to FIG. 10.

Figure 11:
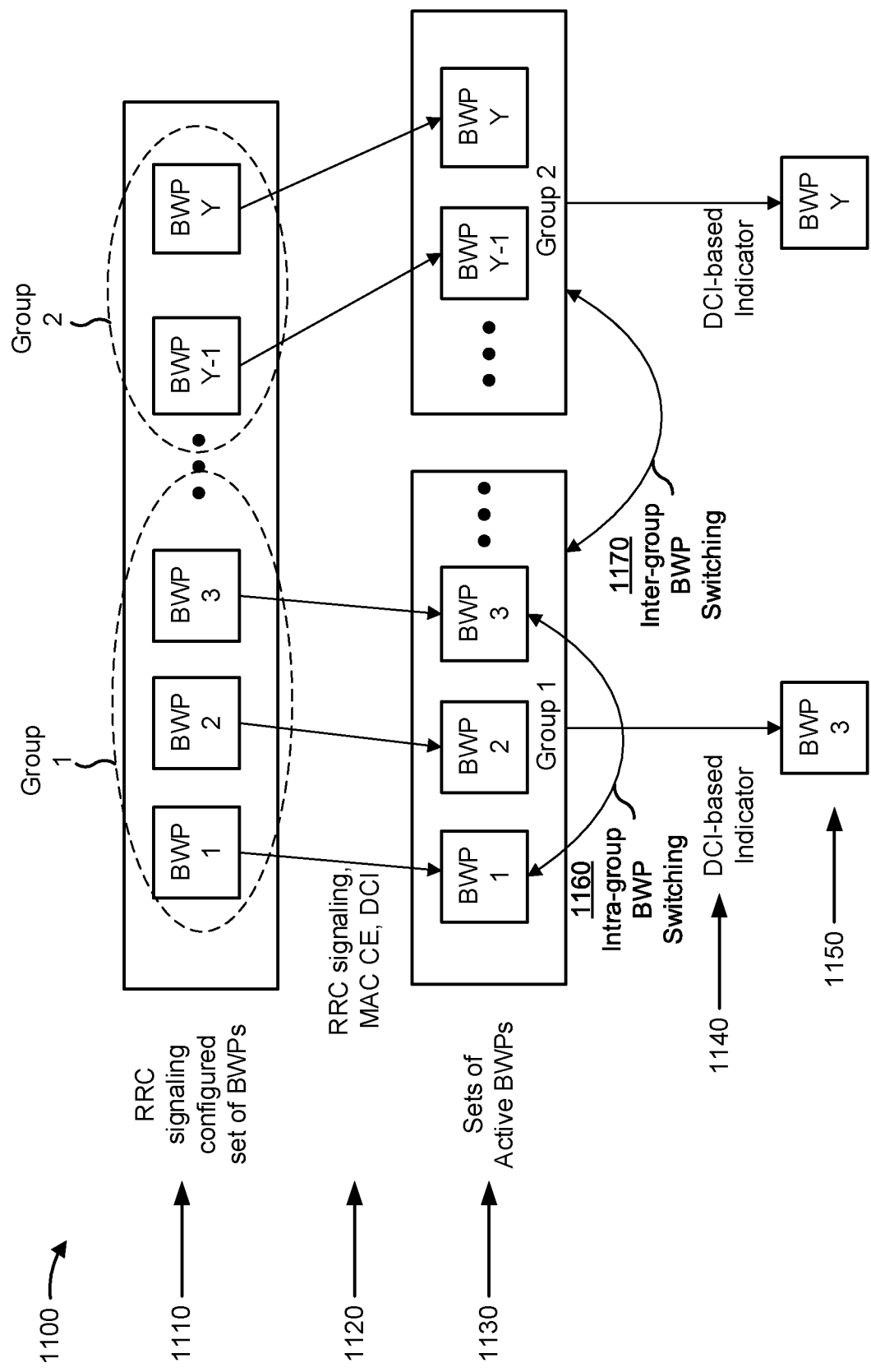
FIG. 11 is a diagram illustrating an example of BWP selection, in accordance with various aspects of the present disclosure.

FIG. 11 is a diagram illustrating an example 1100 of bandwidth part (BWP) selection, in accordance with various aspects of the present disclosure. FIG. 11 shows an example of configuration of a set of BWPs that includes various groups of BWPs, selection of a group of BWPs as a set of active BWPs, and selection of a particular BWP from the set of active BWPs for a post-BWP selection process communication, as described elsewhere herein.

As shown by reference number 1110, a set of BWPs may be configured to a UE (e.g., UE 120) via RRC signaling (shown as "RRC signaling configured set of BWPs"). For example, the set of BWPs shown in FIG. 11 includes BWP 1 through BWP Y, which were configured to the UE via a first communication of a BWP selection process. In some aspects, the set of BWPs may include various groups of BWPs (e.g., shown as group 1 and group 2). For example, the various groups of BWPs may be based at least in part on a set of grouping criteria, as described elsewhere herein.

As shown by reference number 1120, and based at least in part on RRC signaling, a MAC CE, DCI, and/or the like from a BS (e.g., BS 110), the UE may select a subset of BWPs from the set of BWPs. For example, the RRC signaling, the MAC CE, the DCI, and/or the like may be a second communication of the BWP selection process and may include information that identifies a particular group of BWPs (e.g., group 1, in the example shown in FIG. 11) to be selected as the subset of BWPs.

As shown by reference number 1130, the subset of BWPs (e.g., a particular group of BWPs) may be a set of active BWPs. For example, the UE may select a particular BWP from a particular group of BWPs for a post-BWP selection process communication. In some aspects, the UE may select different groups of BWPs as the subset of BWPs based at least in part on different RRC signaling, different MAC CEs, different DCI, and/or the like. For example, and as shown in FIG. 11, the UE may select group 2, rather than group 1, as the subset of BWPs based at least in part on different RRC signaling, different MAC CEs, different DCI, and/or the like.

As shown by reference number 1140, and based at least in part on a DCI-based indicator, the UE may select a particular BWP from the group of BWPs selected as the subset of BWPs. For example, the DCI-based indicator may be included in a third communication of the BWP selection process and may include information that identifies a particular BWP to use for a post-BWP selection process communication. As shown by reference number 1050, the UE may select BWP 3, for example, as the particular BWP when group 1 is the subset of BWPs, or may select BWP Y as the particular BWP when group 2 is the subset of BWPs.

In some aspects, the UE may transmit or receive a post-BWP selection process communication using BWP 3 when group 1 is the subset of BWPs, or BWP Y when group 2 is the subset of BWPs. In some aspects, and as shown by reference number 1160, the UE may receive another DCI-based indicator (e.g., another third communication of the BWP selection process) and may select a different BWP as the particular BWP from the group of BWPs that is the subset of BWPs (e.g., intra-group BWP switching). Additionally, or alternatively, and as shown by reference number 1170, the UE may receive additional RRC signaling, an additional MAC CE, additional DCI, and/or the like (e.g., another second communication of the BWP selection process), and may select a different group of BWPs as the subset of BWPs (e.g., inter-group BWP switching).

As indicated above, FIG. 11 is provided as an example. Other examples may differ from what is described with respect to FIG. 11.

Figure 12:
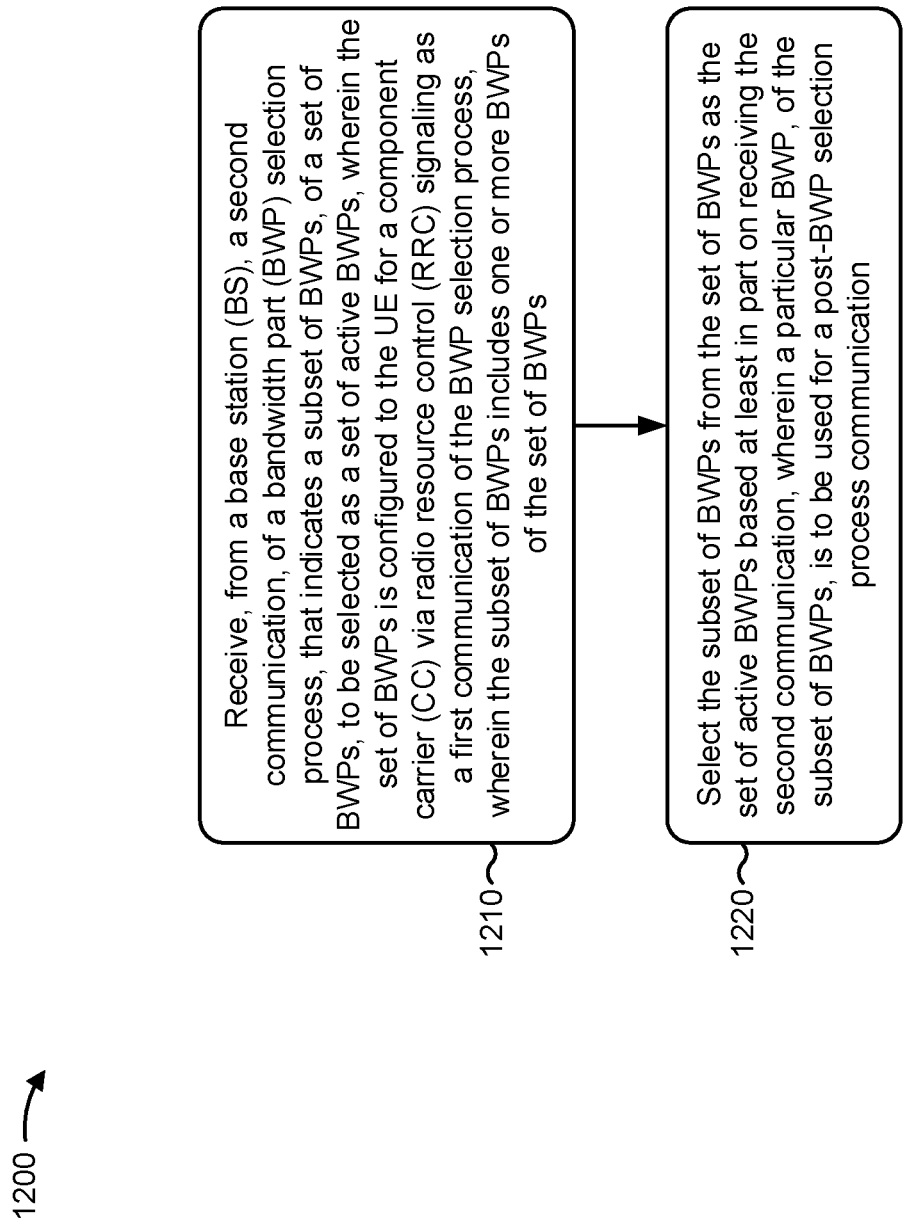
FIG. 12 is a diagram illustrating an example process performed, for example, by a UE, in accordance with various aspects of the present disclosure.

FIG. 12 is a diagram illustrating an example process 1200 performed, for example, by a UE, in accordance with various aspects of the present disclosure. Example process 1200 is an example where a UE (e.g., UE 120) performs bandwidth part (BWP) selection.

As shown in FIG. 12, in some aspects, process 1200 may include receiving, from a base station (BS), a second communication, of a bandwidth part (BWP) selection process, that indicates a subset of BWPs, of a set of BWPs, to be selected as a set of active BWPs, wherein the set of BWPs is configured to the UE for a component carrier (CC) via radio resource control (RRC) signaling as a first communication of the BWP selection process, wherein the subset of BWPs includes one or more BWPs of the set of BWPs (block 1210). For example, the UE (e.g., using antenna 252, DEMOD 254, MIMO detector 256, receive processor 258, controller/processor 280, and/or the like) may receive, from a base station (BS), a second communication, of a bandwidth part (BWP) selection process, that indicates a subset of BWPs, of a set of BWPs, to be selected as a set of active BWPs, as described above. In some aspects, the set of BWPs is configured to the UE for a component carrier (CC) via radio resource control (RRC) signaling as a first communication of the BWP selection process. In some aspects, the subset of BWPs includes one or more BWPs of the set of BWPs.

As shown in FIG. 12, in some aspects, process 1200 may include selecting the subset of BWPs from the set of BWPs as the set of active BWPs based at least in part on receiving the second communication, wherein a particular BWP, of the subset of BWPs, is to be used for a post-BWP selection process communication (block 1220). For example, the UE (e.g., using controller/processor 280 and/or the like) may select the subset of BWPs from the set of BWPs as the set of active BWPs based at least in part on receiving the second communication, as described above. In some aspects, a particular BWP, of the subset of BWPs, is to be used for a post-BWP selection process communication.

Process 1200 may include additional aspects, such as any single aspect and/or any combination of aspects described below and/or in connection with one or more other processes described elsewhere herein.

In a first aspect, the set of BWPs includes more than four BWPs. In a second aspect, alone or in combination with the first aspect, the subset of BWPs includes four BWPs. In a third aspect, alone or in combination with one or more of the first and second aspects, the UE may remove one or more of the one or more BWPs from the subset of BWPs.

In a fourth aspect, alone or in combination with one or more of the first through third aspects, the UE may add one or more additional BWPs, from the set of BWPs, to the subset of BWPs. In a fifth aspect, alone or in combination with one or more of the first through third aspects, the UE may replace the set of active BWPs or the particular BWP based at least in part on a BWP indicator included in downlink control information (DCI). In a sixth aspect, alone or in combination with one or more of the first through fifth aspects, the second communication includes: RRC signaling, a medium access control control element (MAC CE), or DCI.

In a seventh aspect, alone or in combination with one or more of the first through sixth aspects, at least one BWP, of the subset of BWPs, is a default BWP, and the particular BWP is the default BWP. In an eighth aspect, alone or in combination with one or more of the first through seventh aspects, the default BWP is maintained in the subset of BWPs after replacing one or more BWPs of the set of active BWPs. In a ninth aspect, alone or in combination with one or more of the first through eighth aspects, the default BWP is a lower power BWP or a lower bandwidth BWP than other BWPs included in the subset of BWPs.

In a tenth aspect, alone or in combination with one or more of the first through ninth aspects, the set of BWPs includes one or more groups of BWPs based at least in part on a set of grouping criteria, wherein the subset of BWPs is included in the set of BWPs as a group of BWPs of the one or more groups of BWPs. In an eleventh aspect, alone or in combination with one or more of the first through tenth aspects, the set of grouping criteria includes a set of baseband-related parameters that differ across the one or more groups of BWPs. In a twelfth aspect, alone or in combination with one or more of the first through eleventh aspects, the set of baseband-related parameters includes: a scheduling offset, an aperiodic channel state information reference signal (A-CSI-RS) triggering offset, or a time-domain resource allocation. In a thirteenth aspect, alone or in combination with one or more of the first through twelfth aspects, the UE may replace the group of BWPs with another group of BWPs from the one or more groups of BWPs.

In a fourteenth aspect, alone or in combination with one or more of the first through thirteenth aspects, a first switching delay associated with switching BWPs within the group of BWPs is different than a second switching delay associated with switching from the group of BWPs to another group of BWPs of the one or more groups of BWPs. In a fifteenth aspect, alone or in combination with one or more of the first through fourteenth aspects, the first switching delay is a near-zero switching delay. In some aspects, the second switching delay is based at least in part on pre-configured information.

In a sixteenth aspect, alone or in combination with one or more of the first through fifteenth aspects, the UE may select the particular BWP based at least in part on a DCI-based indicator from the BS, wherein the DCI-based indicator is included in a third communication of the BWP selection process. In a seventeenth aspect, alone or in combination with one or more of the first through sixteenth aspects, the UE may select, from one or more groups of BWPs included in the set of BWPs, a group of BWPs as the subset of BWPs.

In an eighteenth aspect, alone or in combination with one or more of the first through seventeenth aspects, the UE may switch from the particular BWP to another BWP within the group of BWPs based at least in part on a DCI-based indicator, wherein the DCI-based indicator is included in a third communication of the BWP selection process. In a nineteenth aspect, alone or in combination with one or more of the first through eighteenth aspects, the UE may switch from the group of BWPs to another group of BWPs, of the one or more groups of BWPs, as the subset of BWPs based at least in part on a downlink control information (DCI)-based indicator, a MAC CE, or RRC signaling.

In a twentieth aspect, alone or in combination with one or more of the first through nineteenth aspects, the UE may receive the post-BWP selection process communication using the particular BWP based at least in part on selecting the subset of BWPs. In a twenty-first aspect, alone or in combination with one or more of the first through twentieth aspects, the UE may transmit the post-BWP selection process communication using the particular BWP based at least in part on selecting the subset of BWPs.

Although FIG. 1200 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
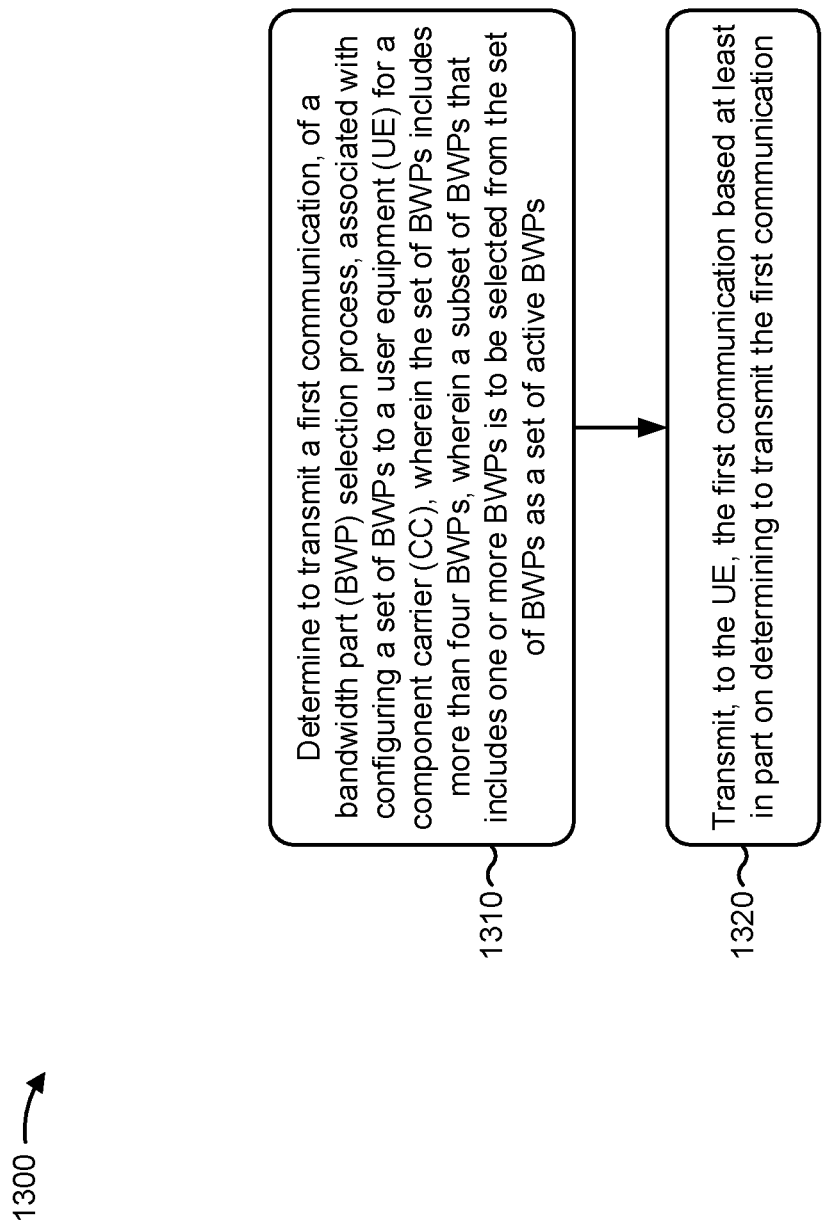
FIG. 13 is a diagram illustrating an example process performed, for example, by a BS, in accordance with various aspects of the present disclosure.

FIG. 13 is a diagram illustrating an example process 1300 performed, for example, by a BS, in accordance with various aspects of the present disclosure. Example process 1300 is an example where a BS (e.g., BS 110) performs bandwidth part (BWP) selection.

As shown in FIG. 13, in some aspects, process 1300 may include determining to transmit a first communication, of a BWP selection process, associated with configuring a set of BWPs to a UE for a CC, wherein the set of BWPs includes more than four BWPs, wherein a subset of BWPs that includes one or more BWPs is to be selected from the set of BWPs as a set of active BWPs (block 1310). For example, the BS (e.g., using controller/processor 240 and/or the like) may determine to transmit a first communication, of a BWP selection process, associated with configuring a set of BWPs to a UE for a CC, as described above. In some aspects, the set of BWPs includes more than four BWPs. In some aspects, a subset of BWPs that includes one or more BWPs is to be selected from the set of BWPs as a set of active BWPs.

As shown in FIG. 13, in some aspects, process 1300 may include transmitting, to the UE, the first communication based at least in part on determining to transmit the first communication (block 1320). For example, the BS (e.g., using controller/processor 240, transmit processor 220, TX MIMO processor 230, MOD 232, antenna 234, and/or the like) may transmit, to the UE, the first communication based at least in part on determining to transmit the first communication, as described above.

Process 1300 may include additional aspects, such as any single aspect and/or any combination of aspects described below and/or in connection with one or more other processes described elsewhere herein.

In a first aspect, the first communication is RRC signaling. In a second aspect, alone or in combination with the first aspect, the subset of BWPs includes four BWPs.

In a third aspect, alone or in combination with one or more of the first and second aspects, the BS may transmit, to the UE, a second communication, of the BWP selection process, that indicates one or more of the one or more BWPs to be removed from the subset of BWPs, wherein the second communication is DCI that includes a BWP indicator. In a fourth aspect, alone or in combination with one or more of the first through third aspects, the BS may transmit, to the UE, a second communication, of the BWP selection process, that indicates one or more additional BWPs from the set of BWPs to be added to the subset of BWPs, wherein the second communication is DCI that includes a BWP indicator.

In a fifth aspect, alone or in combination with one or more of the first through fourth aspects, the BS may transmit, to the UE, a second communication, of the BWP selection process, that indicates the subset of BWPs, of the set of BWPs, to be selected as the set of active BWPs, wherein a particular BWP, of the subset of BWPs, is to be used for a post-BWP selection process communication. In a sixth aspect, alone or in combination with one or more of the first through fifth aspects, the second communication includes: RRC signaling, a MAC CE, or DCI.

In a seventh aspect, alone or in combination with one or more of the first through sixth aspects, at least one BWP of the subset of BWPs is a default BWP, and wherein the default BWP is to be used for a post-BWP selection process communication transmitted to the UE or received from the UE. In an eighth aspect, alone or in combination with one or more of the first through seventh aspects, the default BWP is maintained in the subset of BWPs after replacing one or more BWPs of the subset of BWPs. In some aspects, the default BWP is a lower power BWP or a lower bandwidth BWP than other BWPs included in the set of BWPs.

In a ninth aspect, alone or in combination with one or more of the first through eighth aspects, the set of BWPs includes one or more groups of BWPs based at least in part on a set of grouping criteria, wherein the subset of BWPs is included in the set of BWPs as a group of BWPs of the one or more groups of BWPs. In a tenth aspect, alone or in combination with one or more of the first through ninth aspects, the set of grouping criteria includes a set of baseband-related parameters that differ across the one or more groups of BWPs. In an eleventh aspect, alone or in combination with one or more of the first through tenth aspects, the set of baseband-related parameters includes: a scheduling offset, an aperiodic channel state information reference signal (A-CSI-RS) triggering offset, or a time-domain resource allocation.

In a twelfth aspect, alone or in combination with one or more of the first through eleventh aspects, the BS may transmit, to the UE, a second communication, of the BWP selection process, associated with causing the UE to select the subset of BWPs based at least in part on selecting the group of BWPs. In a thirteenth aspect, alone or in combination with one or more of the first through twelfth aspects, a first switching delay associated with switching BWPs within the group of BWPs is different than a second switching delay associated with switching from the group of BWPs to another group of BWPs of the one or more groups of BWPs. In a fourteenth aspect, alone or in combination with one or more of the first through thirteenth aspects, the first switching delay is a near-zero switching delay. In a fifteenth aspect, alone or in combination with one or more of the first through fourteenth aspects, the second switching delay is based at least in part on pre-configured information.

In a sixteenth aspect, alone or in combination with one or more of the first through fifteenth aspects, the BS may transmit, to the UE, a third communication, of the BWP selection process, associated with causing the UE to select a particular BWP, of the subset of BWPs, to use for a post-BWP selection process communication. In a seventeenth aspect, alone or in combination with one or more of the first through sixteenth aspects, the third communication is a DCI-based indicator.

In an eighteenth aspect, alone or in combination with one or more of the first through seventeenth aspects, the BS may transmit, to the UE, a second communication, of the BWP selection process, associated with causing the UE to select, from one or more groups of BWPs included in the set of BWPs, a group of BWPs as the subset of BWPs. In a nineteenth aspect, alone or in combination with one or more of the first through eighteenth aspects, the BS may transmit, to the UE, another second communication, of the BWP selection process, associated with causing the UE to switch from the group of BWPs to another group of BWPs, of the one or more groups of BWPs, as the subset of BWPs. In a twentieth aspect, alone or in combination with one or more of the first through third aspects, the other second communication is a DCI-based indicator, a MAC CE, or RRC signaling.

In a twenty-first aspect, alone or in combination with one or more of the first through twentieth aspects, the BS may receive, from the UE, a post-BWP selection process communication using a particular BWP, of the subset of BWPs, based at least in part on transmitting the first communication to the UE. In a twenty-second aspect, alone or in combination with one or more of the first through twenty-first aspects, the BS may transmit, to the UE, a post-BWP selection process communication using a particular BWP, of the subset of BWPs, based at least in part on transmitting the first communication to the UE.

Although FIG. 1300 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a base station (BS), a second communication, of a bandwidth part (BWP) selection process, that indicates a subset of BWPs, of a set of BWPs, to be selected as a set of active BWPs,
      wherein the set of BWPs is configured to the UE for a component carrier (CC) via radio resource control (RRC) signaling as a first communication of the BWP selection process,
      wherein the subset of BWPs includes one or more BWPs of the set of BWPs; and
   selecting the subset of BWPs from the set of BWPs as the set of active BWPs based at least in part on receiving the second communication,
      wherein a particular BWP, of the subset of BWPs, is to be used for a post-BWP selection process communication,
      wherein the subset of BWPs is included in the set of BWPs as a group of BWPs, and
      wherein a first switching delay associated with switching BWPs within the group of BWPs is different than a second switching delay associated with switching from the group of BWPs to another group of BWPs.

2. The method of claim 1, wherein the set of BWPs includes more than four BWP and the subset of BWPs includes four BWPs.

3. The method of claim 1, further comprising:
   removing or adding a BWP to or from the subset of BWPs.

4. The method of claim 1, further comprising:
   adding one or more additional BWPs, from the set of BWPs, to the subset of BWPs.

5. The method of claim 1, further comprising:
   replacing the set of active BWPs or the particular BWP based at least in part on a BWP indicator included in downlink control information (DCI).

6. The method of claim 1, wherein the second communication includes:
   RRC signaling,
   a medium access control control element (MAC CE), or
   downlink control information (DCI).

7. The method of claim 1, wherein at least one BWP, of the subset of BWPs, is a default BWP, and
   wherein the particular BWP is the default BWP.

8. The method of claim 7, wherein the default BWP is maintained in the subset of BWPs after replacing one or more BWPs of the set of active BWPs.

9. The method of claim 1, wherein the set of BWPs includes one or more groups of BWPs based at least in part on a set of grouping criteria,
   wherein the one or more groups of BWPs include the group of BWPs.

10. The method of claim 9, wherein the set of grouping criteria includes a set of baseband-related parameters that differ across the one or more groups of BWPs.

11. The method of claim 10, wherein the set of baseband-related parameters includes:
    a scheduling offset,
    an aperiodic channel state information reference signal (A-CSI-RS) triggering offset, or
    a time-domain resource allocation.

12. The method of claim 9, further comprising:
    replacing the group of BWPs with another group of BWPs from the one or more groups of BWPs.

13. The method of claim 9, wherein the one or more groups of BWPs further includes the other group of BWPs.

14. The method of claim 13, wherein the second switching delay is based at least in part on pre-configured information.

15. The method of claim 1, further comprising:
    selecting the particular BWP based at least in part on a downlink control information (DCI)-based indicator from the BS,
       wherein the DCI-based indicator is included in a third communication of the BWP selection process.

16. The method of claim 1, wherein selecting the subset of BWPs comprises:
    selecting, from one or more groups of BWPs included in the set of BWPs, a group of BWPs as the subset of BWPs.

17. The method of claim 16, further comprising:
    switching from the particular BWP to another BWP within the group of BWPs based at least in part on a downlink control information (DCI)-based indicator,
       wherein the DCI-based indicator is included in a third communication of the BWP selection process.

18. The method of claim 16, further comprising:
    switching from the group of BWPs to another group of BWPs, of the one or more groups of BWPs, as the subset of BWPs based at least in part on a downlink control information (DCI)-based indicator, a medium access control control element (MAC CE), or RRC signaling.

19. The method of claim 1, further comprising:
    receiving the post-BWP selection process communication using the particular BWP based at least in part on selecting the subset of BWPs.

20. The method of claim 1, further comprising:
    transmitting the post-BWP selection process communication using the particular BWP based at least in part on selecting the subset of BWPs.

21. A method of wireless communication performed by a base station (BS), comprising:
    determining to transmit a first communication, of a bandwidth part (BWP) selection process, associated with configuring a set of BWPs to a user equipment (UE) for a component carrier (CC),
       wherein the set of BWPs includes more than four BWPs,
       wherein a subset of BWPs that includes one or more BWPs is to be selected from the set of BWPs as a set of active BWPs,
       wherein the subset of BWPs is included in the set of BWPs as a group of BWPs, and
       wherein a first switching delay associated with switching BWPs within the group of BWPs is different than a second switching delay associated with switching from the group of BWPs to another group of BWPs; and
    transmitting, to the UE, the first communication based at least in part on determining to transmit the first communication.

22. The method of claim 21, wherein the set of BWPs includes one or more groups of BWPs based at least in part on a set of grouping criteria,
   wherein the one or more groups of BWPs include the group of BWPs.

23. The method of claim 22, wherein the set of grouping criteria includes a set of baseband-related parameters that differ across the one or more groups of BWPs.

24. The method of claim 23, wherein the set of baseband-related parameters includes:
   a scheduling offset,
   an aperiodic channel state information reference signal (A-CSI-RS) triggering offset, or
   a time-domain resource allocation.

25. The method of claim 22, wherein the one or more groups of BWPs further includes the other group of BWPs.

26. The method of claim 21, further comprising:
   transmitting, to the UE, a second communication, of the BWP selection process, associated with causing the UE to select, from one or more groups of BWPs included in the set of BWPs, a group of BWPs as the subset of BWPs.

27. The method of claim 26, further comprising:
   transmitting, to the UE, another second communication, of the BWP selection process, associated with causing the UE to switch from the group of BWPs to another group of BWPs, of the one or more groups of BWPs, as the subset of BWPs.

28. The method of claim 21, further comprising:
   performing, with the UE, a post-BWP selection process communication using a particular BWP, of the subset of BWPs, based at least in part on transmitting the first communication to the UE.

29. A user equipment (UE) for wireless communication, comprising:
   a memory; and
   one or more processors coupled to the memory, the memory and the one or more processors configured to:
      receive, from a base station (BS), a second communication, of a bandwidth part (BWP) selection process, that indicates a subset of BWPs, of a set of BWPs, to be selected as a set of active BWPs,
         wherein the set of BWPs is configured to the UE for a component carrier (CC) via radio resource control (RRC) signaling as a first communication of the BWP selection process,
         wherein the subset of BWPs includes one or more BWPs of the set of BWPs; and
      select the subset of BWPs from the set of BWPs as the set of active BWPs based at least in part on receiving the second communication,
         wherein a particular BWP, of the subset of BWPs, is to be used for a post-BWP selection process communication,
         wherein the subset of BWPs is included in the set of BWPs as a group of BWPs, and
         wherein a first switching delay associated with switching BWPs within the group of BWPs is different than a second switching delay associated with switching from the group of BWPs to another group of BWPs.

30. A base station (BS) for wireless communication, comprising:
   a memory; and
   one or more processors coupled to the memory, the memory and the one or more processors configured to:
      determine to transmit a first communication, of a bandwidth part (BWP) selection process, associated with configuring a set of BWPs to a user equipment (UE) for a component carrier (CC),
         wherein the set of BWPs includes more than four BWPs,
         wherein a subset of BWPs that includes one or more BWPs is to be selected from the set of BWPs as a set of active BWPs,
         wherein the subset of BWPs is included in the set of BWPs as a group of BWPs, and
         wherein a first switching delay associated with switching BWPs within the group of BWPs is different than a second switching delay associated with switching from the group of BWPs to another group of BWPs; and
      transmit, to the UE, the first communication based at least in part on determining to transmit the first communication.

* * * * *